United States Patent
Nakao et al.

(10) Patent No.: US 11,422,281 B2
(45) Date of Patent: *Aug. 23, 2022

(54) FOREIGN MATTER DETECTING DEVICE

(71) Applicant: OMRON Corporation, Kyoto (JP)

(72) Inventors: Goro Nakao, Inazawa (JP); Takanori Imazawa, Ichinomiya (JP)

(73) Assignee: OMRON CORPORATION, Kyoto (JP)

( * ) Notice: Subject to any disclaimer, the term of this patent is extended or adjusted under 35 U.S.C. 154(b) by 278 days.

This patent is subject to a terminal disclaimer.

(21) Appl. No.: 16/935,511

(22) Filed: Jul. 22, 2020

(65) Prior Publication Data
US 2021/0055446 A1    Feb. 25, 2021

(30) Foreign Application Priority Data
Aug. 19, 2019   (JP) .............................. JP2019-149852

(51) Int. Cl.
*H02J 50/12*    (2016.01)
*G01V 3/10*    (2006.01)
*H02J 50/60*    (2016.01)

(52) U.S. Cl.
CPC .............. *G01V 3/105* (2013.01); *H02J 50/12* (2016.02); *H02J 50/60* (2016.02)

(58) Field of Classification Search
CPC ..................................................... H02J 50/60
See application file for complete search history.

(56) References Cited

U.S. PATENT DOCUMENTS

| | | | |
|---|---|---|---|
| 2013/0241300 A1* | 9/2013 | Miyamoto | H02J 50/70 307/104 |
| 2013/0263596 A1* | 10/2013 | Arisawa | H02K 1/00 60/643 |
| 2013/0293026 A1* | 11/2013 | Miyamoto | B60L 53/124 307/104 |
| 2015/0311725 A1* | 10/2015 | Yamamoto | H02J 50/10 307/104 |
| 2018/0166928 A1* | 6/2018 | Wu | H01F 38/14 |
| 2018/0198323 A1* | 7/2018 | Widmer | H02J 50/10 |
| 2019/0067978 A1* | 2/2019 | Liu | H02J 5/005 |
| 2019/0199144 A1* | 6/2019 | Jadidian | H01F 27/29 |

FOREIGN PATENT DOCUMENTS

JP    2018-207764 A    12/2018

* cited by examiner

*Primary Examiner* — Daniel Kessie
(74) *Attorney, Agent, or Firm* — Metrolex IP Law Group, PLLC (57) ABSTRACT

A foreign matter detecting device includes a plurality of detection coils disposed so as to be capable of being electromagnetically coupled to each other between a transmission coil of a power transmission device and a reception coil of a power reception device between which power is transmitted in a non-contact manner, a plurality of capacitors each forming a resonance circuit together with each of the plurality of detection coils, a power supply circuit supplying AC power having a predetermined frequency to an input coil that is one of the plurality of detection coils, and a detection circuit detecting a voltage of AC power transmitted via the plurality of detection coils from an output coil that one of the plurality of detection coils and is different from the input coil, and detecting foreign matter entrapped between the transmission coil and the reception coil according to the voltage detected.

15 Claims, 7 Drawing Sheets

FOREIGN MATTER DETECTING DEVICE

CROSS-REFERENCE TO RELATED APPLICATION

This application is based on Japanese Patent Application No. 2019-149852 filed with the Japan Patent Office on Aug. 19, 2019, the entire contents of which are incorporated herein by reference.

FIELD

The disclosure relates to a foreign matter detecting device that detects foreign matter in a power transmission system in which power is transmitted in a non-contact manner.

BACKGROUND

Conventionally, research has been conducted on so-called a non-contact power feeding (also called wireless power feeding) technique of transmitting power through space without using metal contacts or the like. As one of such non-contact power feeding techniques, a method of feeding power by electromagnetic induction is known. In the method of feeding power by electromagnetic induction, a primary-side (power transmission-side or power feeding-side) coil (hereinafter referred to as a transmission coil) and a secondary side (power reception side) coil (hereinafter referred to as a reception coil) are electromagnetically coupled. As a result, power is transmitted from the transmission coil to the reception coil.

In a power transmission system using such a non-contact power feeding technique, foreign matter such as metal may be entrapped between a transmission coil and a reception coil. In such a case, the foreign matter may be inductively heated and ignited during power transmission, or a device may be failed due to heat generation of the foreign matter. In addition, in such a power transmission system, the relative positional relationship between a transmission coil and a reception coil may fluctuate during power transmission, and as a result, the coupling degree between the transmission coil and the reception coil may change. Therefore, there is proposed a technique of preventing a failure due to foreign matter entrapped between a transmission coil and a reception coil even in a case where the degree of coupling between the transmission coil and the reception coil changes (for example, see Japanese Patent Laid-Open No. 2018-207764). In this technique, in a case where a non-contact power feeding apparatus does not output power at a constant voltage even if the frequency of AC power supplied to the transmission coil of a power transmission device included in the non-contact power feeding apparatus is changed over a predetermined frequency range, the non-contact power feeding apparatus judges that certain foreign matter is entrapped between the transmission coil and the reception coil of a power reception device, and stops power supply to the transmission coil.

However, in a case where very small foreign matter is entrapped between the transmission coil and the reception coil, power transmission characteristics from the power transmission device to the power reception device does not change. As a result, the foreign matter that has been entrapped between the transmission coil and the reception coil may not be detected.

SUMMARY

Therefore, one or more aspects aim to provide a foreign matter detecting device that can improve the detection accuracy of foreign matter entrapped between a transmission coil of a power transmission-side device and a reception coil of a power reception-side device.

As one aspect, a foreign matter detecting device is provided. This foreign matter detecting device includes a plurality of detection coils disposed so as to be capable of being electromagnetically coupled to each other between a transmission coil of a power transmission device and a reception coil of a power reception device between which power is transmitted in a non-contact manner, a plurality of capacitors forming a resonance circuit together with each of the plurality of detection coils, a power supply circuit configured to supply AC power having a predetermined frequency to an input coil which is one of the plurality of detection coils, and a detection circuit configured to detect a voltage of AC power transmitted via the plurality of detection coils from an output coil which is one of the plurality of detection coils is different from the input coil and to detect foreign matter entrapped between the transmission coil and the reception coil according to the voltage detected. According to the configuration described above, the foreign matter detecting device according to the present one or more aspects can improve the detection accuracy of foreign matter entrapped between the transmission coil of the power transmission-side device and the reception coil of the power reception-side device.

In this foreign matter detecting device, it may be preferable that the detection circuit judges that there is foreign matter entrapped between the transmission coil and the reception coil in a case where the voltage detected is out of a predetermined reference voltage range. Therefore, the foreign matter detecting device can detect foreign matter entrapped between the transmission coil and the reception coil more accurately.

Furthermore, in this foreign matter detecting device, it may be preferable that the resonance frequency of the resonance circuit formed by each of the plurality of detection coils and each of the plurality of the capacitors corresponding to each of the plurality of detection coils differs from the frequency of AC power supplied to the transmission coil. Therefore, the foreign matter detecting device can prevent power transmitted from the power transmission device to the power reception device from affecting detection of foreign matter entrapped between the transmission coil and the reception coil, and can detect the foreign matter accurately.

Alternatively, in this foreign matter detecting device, it may be preferable that the predetermined frequency of the AC power supplied from the power supply circuit is different from the frequency of AC power supplied to the transmission coil. Therefore, the foreign matter detecting device can prevent AC power for detecting foreign matter from affecting power transmission from the power transmission device to the power reception device. In addition, the foreign matter detecting device can prevent the power transmitted from the power transmission device to the power reception device from affecting detection of foreign matter entrapped between the transmission coil and the reception coil, and can detect the foreign matter accurately.

Furthermore, in this foreign matter detecting device, it may be preferable that the plurality of detection coils is disposed so as to cover entirety of the transmission coil as viewed from the central axis direction of the transmission coil. Therefore, the foreign matter detecting device can detect foreign matter entrapped between the transmission coil and the reception coil highly accurately not depending on the position of the foreign matter.

In this case, it may be preferable that the size of each of the plurality of detection coils viewed from the central axis direction of the transmission coil is smaller than the size of the transmission coil viewed from the central axis direction of the transmission coil. Therefore, the foreign matter detecting device can detect foreign matter entrapped between the transmission coil and the reception coil accurately even if the foreign matter is smaller than the transmission coil.

DETAILED DESCRIPTION

Hereinafter, a foreign matter detecting device according to an embodiment or embodiments will be described with reference to the drawings. This foreign matter detecting device includes a substrate disposed between a transmission coil of a power transmission-side device (hereinafter, simply referred to as a power transmission device) and a reception coil of a power reception-side device (hereinafter, simply referred to as a power reception device) included in a power transmission system that transmits power in a non-contact manner, and a plurality of detection coils formed on the board so as to be electromagnetically coupled to each other. Each of the plurality of detection coils can resonate at a frequency which is different from the frequency of power supplied to the transmission coil of the power transmission device, and at which neither of the resonance circuit including the transmission coil (in a case where the resonance circuit is provided on the power transmission side) and the resonance circuit including the reception coil resonates. This foreign matter detecting device supplies AC power having a frequency at which the detection coils resonate to any one of the plurality of detection coils, while detecting a voltage output from another one of the plurality of detection coils.

If foreign matter having conductivity such as metal is entrapped between the transmission coil and the reception coil, the resonance characteristic of any of the plurality of detection coils changes, and as a result, the detected voltage changes. Therefore, this foreign matter detecting device monitors the detected voltage, and if the voltage deviates from the predetermined reference range corresponding to the case where no foreign matter is entrapped, and judges that foreign matter is entrapped between the transmission coil and the reception coil.

Figure 1:
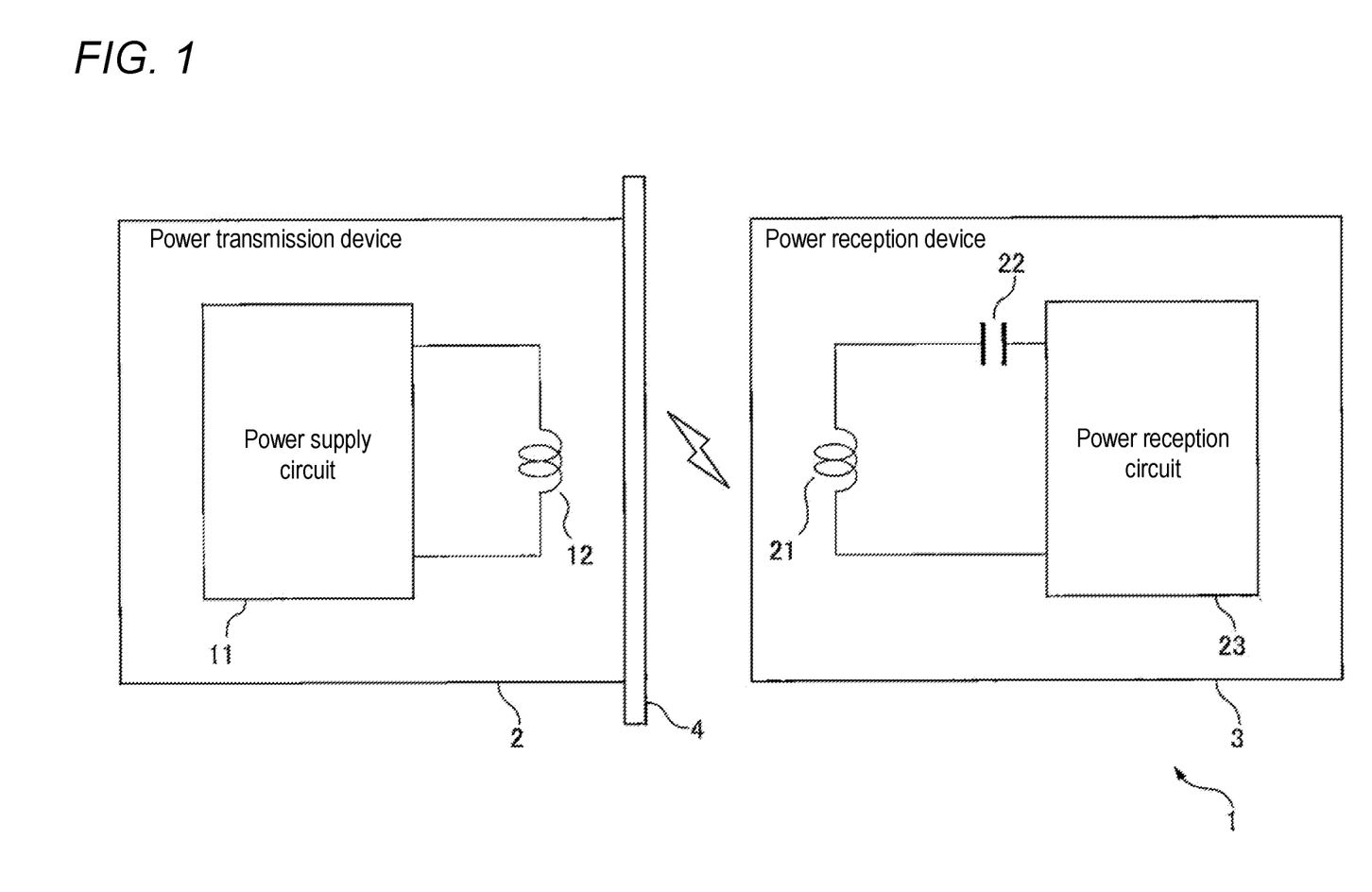
FIG. 1 is a schematic configuration diagram illustrating a power transmission system including a foreign matter detecting device according to an embodiment or embodiments.

FIG. 1 is a schematic configuration diagram of a power transmission system including a foreign matter detecting device according to an embodiment or embodiments. As illustrated in FIG. 1, the power transmission system 1 includes a power transmission device 2, a power reception device 3, and a foreign matter detecting device 4. The power transmission device 2 and the power reception device 3 constitute a non-contact power feeding apparatus, and power is transmitted from the power transmission device 2 to the power reception device 3 in a non-contact manner through space. The power transmission device 2 includes a power supply circuit 11 and a transmission coil 12. In contrast, the power reception device 3 includes a reception coil 21, a resonance capacitor 22, and a power reception circuit 23. The power transmission system 1 can be, for example, a non-contact power feeding apparatus of a so-called series-series resonance capacitor system (SS system) or a series-parallel resonance capacitor system (SP system). Alternatively, the power transmission system 1 may be a non-contact power feeding apparatus of a system (NS system) in which resonance of the primary side is not used and the reception coil and the resonance capacitor are in series resonance on the secondary side, or a system (NP system) in which resonance of the primary side is not used and the reception coil and the resonance capacitor are in parallel resonance on the secondary side.

First, the power transmission device 2 will be described. The power supply circuit 11 supplies AC power to the transmission coil 12. Therefore, the power supply circuit 11 includes, for example, a DC power supply that supplies DC power, an inverter circuit that converts the DC power supplied from the DC power supply into AC power and supplies the AC power to the transmission coil 12, and a control circuit that controls the inverter circuit. The inverter circuit may be a full-bridge inverter in which four switching elements (for example, MOSFETs) are connected in a full-bridge shape, or a half-bridge inverter in which two switching elements are connected in a half-bridge shape. The control circuit turns on/off each switching element included in the inverter circuit so that the frequency of the AC power supplied to the transmission coil 12 becomes a predetermined frequency (for example, the frequency at which the resonance circuit of the power reception device 3 resonates). The power supply circuit 11 may further include a DC-DC converter between the DC power supply and the inverter circuit. Alternatively, the power supply circuit 11 may include a rectifier circuit that is connected to an AC power supply instead of the DC power supply and rectifies AC power from the AC power supply, and a power factor correction circuit that is connected to a rectifier circuit and converts pulsating flow power output from the rectifier circuit to DC power. In this case, for example, the control circuit may control the power factor correction circuit to adjust the voltage of the DC power supplied to the inverter circuit in order to keep the voltage of the power that the power reception device 3 receives constant.

The transmission coil 12 transmits AC power supplied from the power supply circuit 11 to the reception coil 21 of the power reception device 3 through the space. Note that the power transmission device 2 may include a capacitor connected in series with the transmission coil 12 between the transmission coil 12 and the inverter circuit of the power supply circuit 11. This capacitor may be for shutting off DC power, or may be for forming a resonance circuit that resonates with the transmission coil 12 at the frequency of the AC power supplied to the transmission coil 12.

Note that the power transmission device 2 may further include a communication device that receives a signal indicating the power reception status of the power reception device 3. In this case, the control circuit of the power supply circuit 11 may change timing of turning on/off each switching element of the inverter circuit so as to change the frequency of the AC power supplied to the transmission coil 12 according to the power reception status.

Furthermore, if the control circuit of the power supply circuit 11 receives from the foreign matter detecting device 4 a signal indicating that foreign matter entrapped between the transmission coil 12 and the reception coil 21 is detected, each switching element included the inverter circuit may be turned off, and power supply from the power supply circuit 11 to the transmission coil 12 may be stopped.

Next, the power reception device 3 will be described. The reception coil 21 forms a resonance circuit together with the resonance capacitor 22 and resonates with an alternating current flowing through the transmission coil 12 of the power transmission device 2 to receive power from the transmission coil 12. Therefore, the resonance capacitor 22 may be connected in series with the reception coil 21, or may be connected in parallel with the reception coil 21. AC power output from the resonance circuit formed by the reception coil 21 and the resonance capacitor 22 is output to the power reception circuit 23. Note that the number of turns of the reception coil 21 and the number of turns of the transmission coil 12 may be the same or different from each other.

The power reception circuit 23 converts AC power from the resonance circuit formed by the reception coil 21 and the resonance capacitor 22 into DC power, and outputs the DC power to a load circuit (not illustrated) connected to the power reception circuit 23. Therefore, the power reception circuit 23 includes, for example, a full-wave rectifier circuit that converts AC power from the resonance circuit into pulsating flow power, and a smoothing capacitor that smoothes the pulsating flow power output from the full-wave rectifier circuit and outputs the pulsating flow power to the load circuit. Furthermore, the power reception circuit 23 may include a voltmeter for measuring a voltage output to the load circuit, a communication device for transmitting a signal indicating the power reception status, such as a voltage measured by the voltmeter to the power transmission device 2, a switching element for selecting connection or disconnection between the load circuit and the power reception circuit 23, a control circuit for turning on/off the switching element, and the like.

Next, the foreign matter detecting device 4 according to an embodiment will be described. The foreign matter detecting device 4 is disposed between the transmission coil 12 and the reception coil 21 in a case where the power transmission device 2 and the power reception device 3 are in a positional relationship capable of transmitting power, that is, a positional relationship in which the transmission coil 12 and the reception coil 21 can be electromagnetically coupled. The foreign matter detecting device 4 detects foreign matter having conductivity such as metal, the foreign matter being entrapped between the transmission coil 12 and the reception coil 21.

Figure 2:
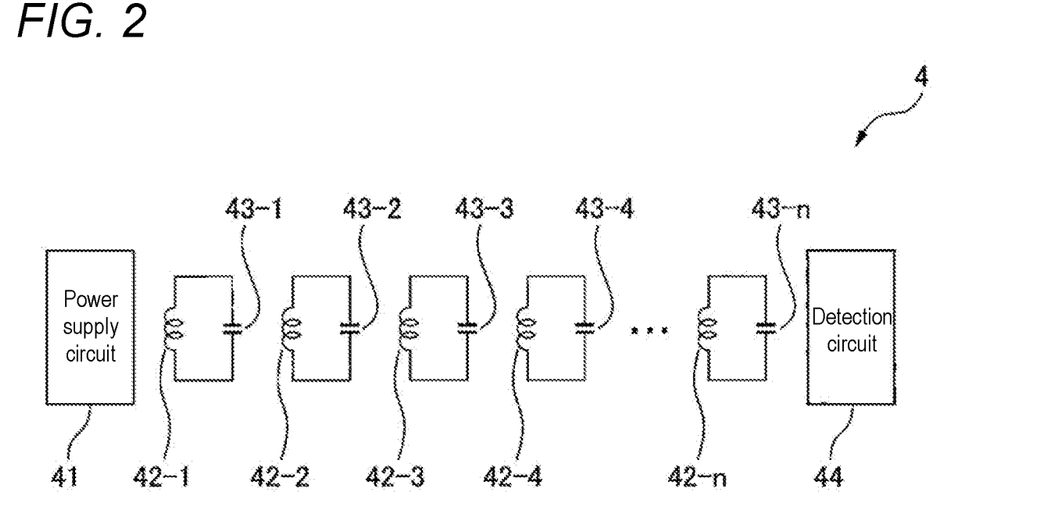
FIG. 2 is a schematic configuration diagram illustrating a foreign matter detecting device.
Figure 3:
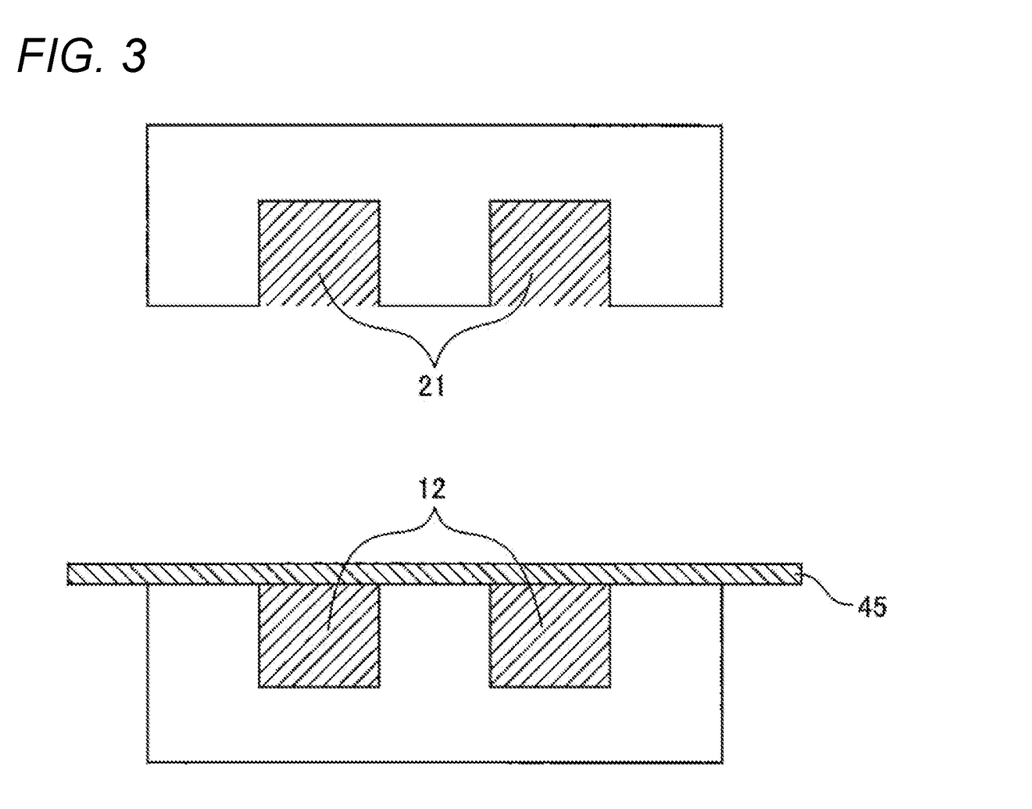
FIG. 3 is a schematic side sectional view illustrating an example of a positional relationship between a substrate on which a foreign matter detecting device is provided and a transmission coil.
Figure 4:
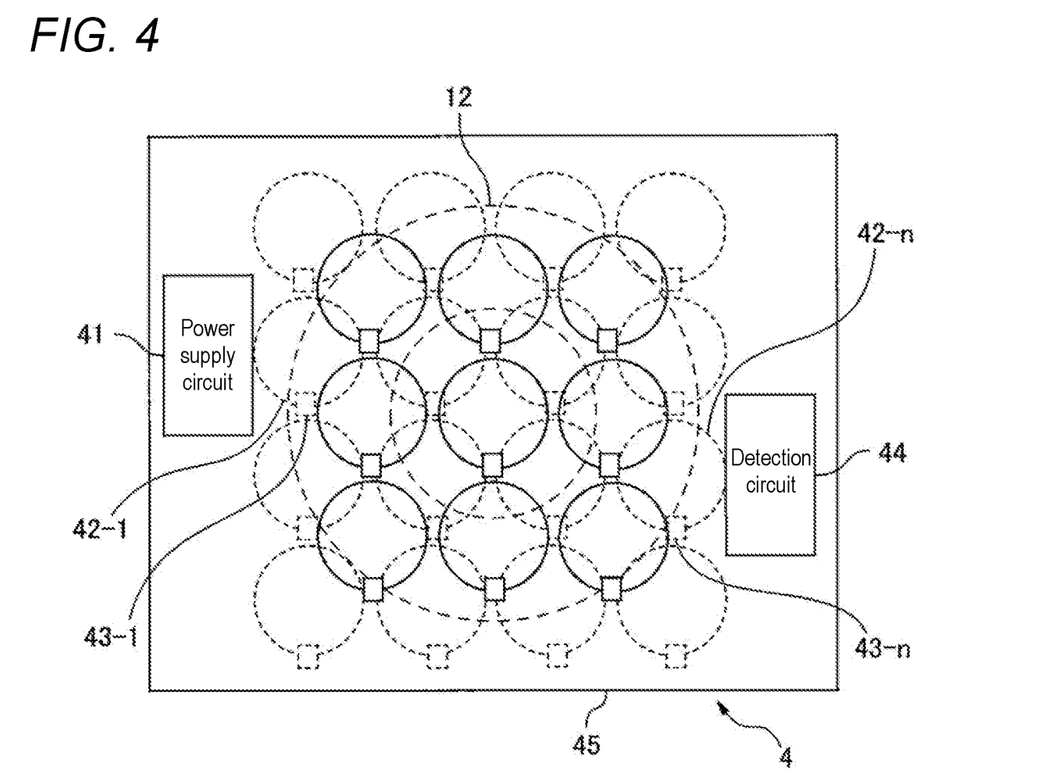
FIG. 4 is a schematic plan view illustrating an example of arrangement of a plurality of detection coils included in a foreign matter detecting device.

FIG. 2 is a schematic configuration diagram of the foreign matter detecting device 4. FIG. 3 is a schematic side sectional view illustrating an example of a positional relationship between a substrate on which the foreign matter detecting device 4 is provided and the transmission coil 12. Furthermore, FIG. 4 is a schematic plan view illustrating an example of arrangement of a plurality of detection coils included in the foreign matter detecting device 4.

As illustrated in FIG. 2, the foreign matter detecting device 4 includes a power supply circuit 41, a plurality of detection coils 42-1 to 42-$n$ ($n$ is an integer of 2 or more), a plurality of capacitors 43-1 to 43-$n$, and a detection circuit 44. The power supply circuit 41, the plurality of detection coils 42-1 to 42-$n$, the plurality of capacitors 43-1 to 43-$n$, and the detection circuit 44 are provided on the substrate 45 located between the transmission coil 12 and the reception coil 21 in a case where the transmission coil 12 and the reception coil 21 are in a positional relationship capable of being electromagnetically coupled. In an embodiment or embodiments, the substrate 45 is attached to the power transmission device 2. A signal indicating the detection result of foreign matter from the detection circuit 44 is output to the power supply circuit 11 of the power transmission device 2.

Figure 5:
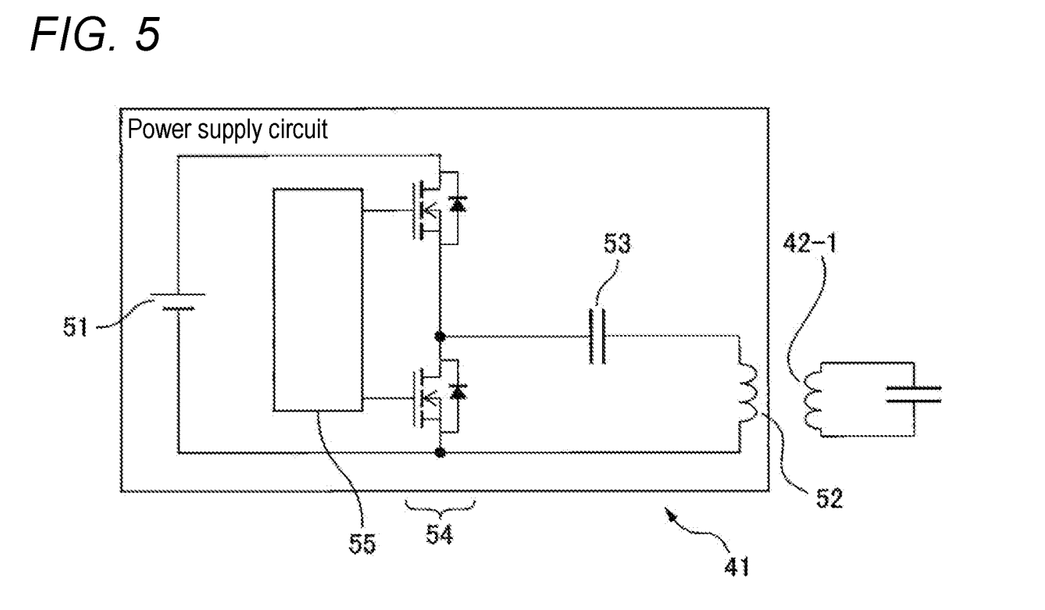
FIG. 5 is a circuit configuration diagram illustrating an example of a power supply circuit.

FIG. 5 is a circuit configuration diagram illustrating an example of the power supply circuit 41. The power supply circuit 41 includes, for example, a DC power supply 51 that supplies DC power, a power feeding coil 52, a capacitor 53, an inverter circuit 54, and a control circuit 55 that controls the inverter circuit 54.

The power feeding coil 52 has one end connected to the inverter circuit 54 via the capacitor 53 and the other end grounded. The power feeding coil 52 is disposed so as to be electromagnetically coupled to an input coil (in an embodiment or embodiments, the detection coil 42-1) that is any of the plurality of detection coils 42-1 to 42-$n$, and supplies AC power from the inverter circuit 54 to the input coil. Note that the connection order of the power feeding coil 52 and the capacitor 53 may be exchanged.

The inverter circuit 54 converts DC power supplied from the DC power supply 51 into AC power and supplies the AC power to the power feeding coil 52. In this example, the inverter circuit 54 is configured as a half-bridge inverter in which two switching elements (for example, MOSFETs) are connected in a full-bridge shape. However, the inverter circuit 54 may be a full-bridge inverter in which four switching elements are connected in a full-bridge shape. The control circuit 55 turns on/off each switching element included in the inverter circuit so that the frequency of AC power supplied to the power feeding coil 52 becomes a predetermined frequency.

Note that it is preferable that the frequency of the AC power supplied from the power supply circuit 41 to the input coil via the power feeding coil 52 is different from the frequency of the AC power supplied to the transmission coil 12 of the power transmission device 2, and is a frequency at which none of the resonance circuit including the transmission coil 12 (in a case where the resonant circuit is provided in the power transmission device 2) and the resonance circuit including the reception coil 21 resonates. For example, the frequency of the AC power supplied by the power supply circuit 41 may be a frequency higher than the frequency (for example, 85 kHz or 150 kHz) of the AC power supplied to the transmission coil 12, for example, 13.56 MHz, 27.12 MHz, or 40.68 MHz belonging to the ISM band. As a result, it is possible to prevent the AC power supplied from the power supply circuit 41 from affecting power transmission from the power transmission device 2 to the power reception device 3. Furthermore, since the frequency of the AC power supplied by the power supply circuit 41 is set in this manner, inductance of each of the plurality of detection coils 42-1 to 42-n included in the foreign matter detecting device 4 can be made relatively small. Therefore, it is easy to make the size of each detection coil smaller than the size of the transmission coil 12.

Referring again to FIGS. 3 and 4, each of the plurality of detection coils 42-1 to 42-n is configured as a wiring pattern made of a conductor such as metal provided on the substrate 45. Each of the detection coils 42-i and each of the corresponding capacitors 43-i (i=1, 2, . . . , n) are connected to each other, and constitute one resonance circuit. It is preferable that the inductance of each detection coil and the capacitance of each capacitor are set such that the resonance frequency of the resonance circuit formed by the detection coil and the capacitor does not resonate at the frequency of the AC power supplied to the transmission coil 12. As a result, each resonance circuit of the foreign matter detecting device 4 does not resonate with the AC power transmitted from the power transmission device 2 to the power reception device 3. Therefore, the foreign matter detecting device 4 can prevent AC power transmitted from the power transmission device 2 to the power reception device 3 from affecting detection of foreign matter. Furthermore, it is preferable that the inductance of each detection coil and the capacitance of each capacitor are set such that the resonance frequency of the resonance circuit formed by the detection coil and the capacitor is a frequency at which the resonance circuit resonates at the frequency of the AC power supplied from the power supply circuit 41. As a result, the loss until the AC power supplied from the power supply circuit 41 reaches the detection circuit 44 is suppressed, and therefore the foreign matter detecting device 4 can suppress deterioration of foreign matter detection accuracy. Note that the resonance frequency of each resonance circuit and the frequency of the AC power supplied from the power supply circuit 41 do not have to match as long as the AC power supplied from the power supply circuit 41 reaches the detection circuit 44.

Furthermore, each of the plurality of detection coils 42-1 to 42-n is disposed on the substrate 45 so as not to make electrical contact with each other and to be electromagnetically coupled to each other. For example, each of the plurality of detection coils 42-1 to 42-n is disposed on the substrate 45 so as to be directly electromagnetically coupled to any one or more of the other detection coils. Therefore, each detection coil resonates with AC power supplied from the power supply circuit 41, together with the corresponding capacitor, and thus the AC power is transmitted to the detection circuit 44.

The substrate 45 is disposed such that the central axis direction of the transmission coil 12 and the normal line direction of the substrate 45 are substantially parallel to each other. The plurality of detection coils 42-1 to 42-n is disposed so as to cover entirety of the transmission coil 12 when the transmission coil 12 is viewed from the central axis direction thereof.

Furthermore, in FIG. 4, among the plurality of detection coils 42-1 to 42-n, detection coils indicated by solid lines are disposed on the surface of the substrate 45 facing the reception coil 21 (hereinafter, referred to as a front surface for convenience). In contrast, among the plurality of detection coils 42-1 to 42-n, detection coils indicated by dotted lines are disposed on a surface of the substrate 45 on the side facing the transmission coil 12 (hereinafter, referred to as a back surface for convenience).

In this example, the plurality of detection coils 42-1 to 42-n is disposed in a two-dimensional array. Then, the respective detection coils are disposed such that the adjacent detection coils are provided on different surfaces of the substrate 45. For example, it is preferable that the adjacent detection coils are disposed so that at least parts of the adjacent detection coils overlap each other when viewed from the normal direction of the front surface of the substrate 45. As a result, the degree of coupling between the adjacent detection coils increases, and as a result, the loss until the AC power supplied from the power supply circuit 41 is transmitted to the detection circuit 44 is reduced.

Note that in the example illustrated in FIG. 4, each of the plurality of detection coils 42-1 to 42-n is formed in a substantially circular shape; however, the shape of each detection coil is not limited to a circular shape, and for example, may be an elliptical shape or a rectangular shape. The shape and size of each of the plurality of detection coils 42-1 to 42-n may be identical or different from each other. Furthermore, it is preferable that the size of each of the plurality of detection coils 42-1 to 42-n is smaller than the size of the transmission coil 12 as viewed from the central axis direction of the transmission coil 12. As a result, even in a case where foreign matter smaller than the transmission coil 12 is entrapped between the transmission coil 12 and the reception coil 21, any of the plurality of detection coils 42-1 to 42-n is easily affected by the foreign matter. Therefore, the foreign matter detecting device 4 can accurately detect such small foreign matter.

The detection circuit 44 detects the voltage of the AC power transmitted via the plurality of detection coils 42-1 to 42-n, and detects foreign matter entrapped between the transmission coil 12 and the reception coil 21 on the basis of the voltage detected.

In an embodiment or embodiments, the AC power transmitted from the power transmission device 2 to the power reception device 3 does not affect transmission of AC power to the detection circuit 44 from the power supply circuit 41 via the plurality of detection coils 42-1 to 42-n. In contrast, if foreign matter is entrapped between the transmission coil 12 and the reception coil 21, the foreign matter changes the resonance characteristic of any of the plurality of detection coils 42-1 to 42-n, and affects transmission of AC power from the power supply circuit 41 to the detection circuit 44. As a result, the voltage detected by the detection circuit 44 changes. For example, when the AC power supplied causes metal to approach any of the detection coils through which a current is flowing, the magnetic flux generated in the vicinity of the detection coil by the current generates an eddy current in the metal to cause loss. In addition, the magnetic flux generated by the eddy current reduces the inductance of the detection coil. In particular, in a case where the metal is a magnetic substance, only the loss may be relatively large although the change in inductance is small. As a result, the resonance characteristic of the resonance circuit including the detection coil changes. Therefore, the detection circuit 44 judges whether or not the voltage detected is included in a predetermined reference range. In a case where the voltage detected is out of the predetermined reference range, the detection circuit 44 judges that foreign matter is entrapped between the transmission coil 12 and the reception coil 21. Note that as the predetermined reference range, only the lower limit value may be set, or both the upper limit value and the lower limit value may be set. In a case where only the lower limit value is set, it is judged that the voltage detected is out of the predetermined reference range in a case where the voltage detected becomes lower than the lower limit value. Furthermore, in a case where both the upper limit value and the lower limit value are set, it is judged that the voltage detected is out of the reference range in a case where the voltage detected becomes lower than the lower limit value or becomes higher than the upper limit value. Note that in this example, the foreign matter detecting device 4 includes only one detection circuit 44. However, the foreign matter detecting device 4 is not limited to this, and the foreign matter detecting device 4 may include two or more detection circuits 44. For example, in FIG. 4, the function of the upper right end portion and the lower left end portion in the array of the plurality of detection coils 42-1 to 42-n as a transmission path of AC power from the power supply circuit 41 to the detection circuit 44 is not so high. Therefore, the detection circuit 44 may be added to either or both of the upper right end and the lower left end of the array of the plurality of detection coils 42-1 to 42-n. As a result, the range in which the foreign matter detecting device 4 can accurately detect foreign matter becomes wider.

Figure 6:
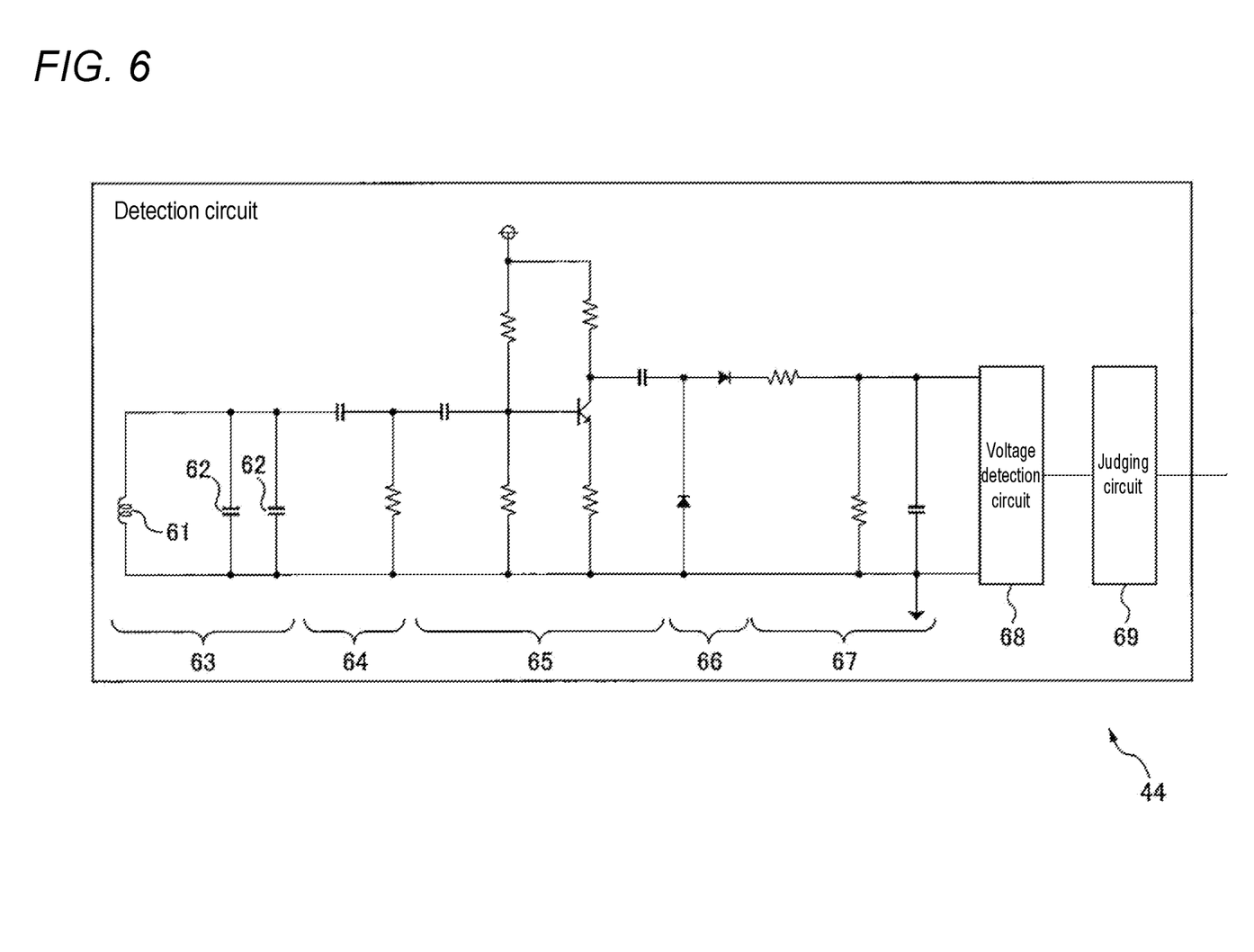
FIG. 6 is a circuit configuration diagram illustrating an example of a detection circuit.

FIG. 6 is a circuit configuration diagram illustrating an example of the detection circuit 44. The detection circuit 44 includes a resonance circuit 63 having a reception coil 61 and a resonance capacitor 62, a high-pass filter 64, an amplifier 65, a half-wave rectifier circuit 66, a low-pass filter 67, a voltage detection circuit 68, and a judging circuit 69. Note that the circuit configuration of the detection circuit 44 is not limited to the circuit configuration in FIG. 6, and may be any of various circuits capable of detecting the voltage of the AC power transmitted by each detection coil and judging whether or not the voltage detected is out of a predetermined reference range.

The resonance circuit 63 detects the AC power supplied from the power supply circuit 41 and transmitted via the plurality of detection coils 42-1 to 42-n. Therefore, the reception coil 61 of the resonance circuit 63 is disposed so as to be electromagnetically coupled directly (that is, without another detection coil therebetween) to an output coil (detection coil 42-n in an embodiment or embodiments) other than the input coil to which AC power is supplied from the power supply circuit 41 among the plurality of detection coils 42-1 to 42-n. The inductance of the reception coil 61 and the capacitance of the resonance capacitor 62 are set so that the resonance circuit 63 resonates with AC power supplied from the power supply circuit 41. Note that FIG. 6 illustrates that two resonance capacitors 62 are connected in parallel with the reception coil 61. However, the number of resonance capacitors 62 included in the resonance circuit 63 is not limited to two, and may be one or three or more. Furthermore, the reception coil 61 and the resonance capacitor 62 may be connected in series.

Note that it is preferable that the output coil (detection coil 42-n) that can be electromagnetically coupled to the reception coil 61 is a detection coil that is not directly electromagnetically coupled to the input coil (detection coil 42-1) to which AC power is supplied from the power supply circuit 41 so that the AC power supplied from the power supply circuit 41 is transmitted to the reception coil 61 after having passed through all of the plurality of detection coils 42-1 to 42-n. In an embodiment or embodiments, as illustrated in FIG. 4, the output coil is located at the end opposite to the end where the input coil is located.

The high-pass filter 64 is connected between the resonance circuit 63 and the amplifier 65, and attenuates noise components having a frequency lower than the frequency of the AC power supplied from the power supply circuit 41 in the AC power that the resonance circuit 63 has received. The amplifier 65 is connected between the high-pass filter 64 and the half-wave rectifier circuit 66, and amplifies the AC power output from the high-pass filter 64.

The half-wave rectifier circuit 66 is connected between the amplifier 65 and the low-pass filter 67 and half-wave rectifies the amplified AC power output from the amplifier 65 and converts the half-wave rectified AC power into pulsating flow power. The low-pass filter 67 is connected between the half-wave rectifier circuit 66 and the voltage detection circuit 68 and smoothes the pulsating flow power output from the half-wave rectifier circuit 66 and converts the smoothed pulsating flow power into DC power.

The voltage detection circuit 68 is connected to the low-pass filter 67 and detects the voltage of the DC power output from the low-pass filter 67. Then, the judging circuit 69 judges whether or not the voltage detected is within a predetermined reference range. In a case where the voltage detected is within the predetermined reference range, the judging circuit 69 judges that there is no foreign matter between the transmission coil 12 and the reception coil 21. In contrast, if the voltage detected is out of the predetermined reference range, the judging circuit 69 judges that there is foreign matter entrapped between the transmission coil 12 and the reception coil 21. Then, the judging circuit 69 outputs a signal indicating the detection result of the foreign matter to the power supply circuit 11 of the power transmission device 2. Note that the voltage detection circuit 68 can be any voltage detection circuit for detecting a DC voltage. Furthermore, the judging circuit 69 may be any of various circuits capable of comparing the voltage detected with a predetermined reference range and outputting a signal according to the comparison result.

Figure 7A:
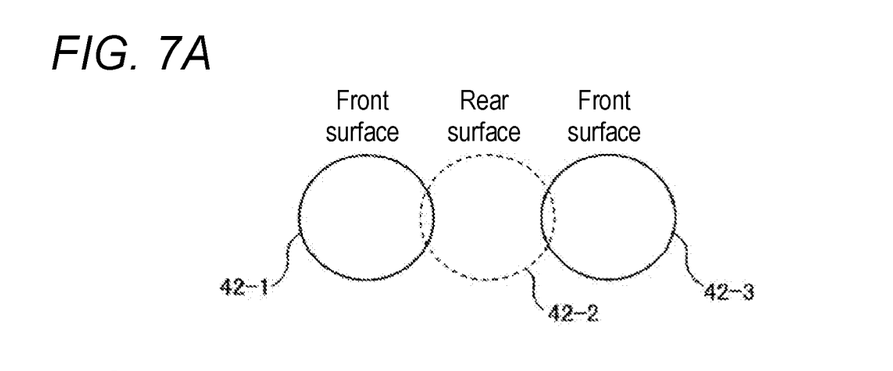
FIGS. 7A and 7B are diagrams illustrating an example of a simulation result indicating a change in a detected voltage depending on the presence or absence of foreign matter.
Figure 7B:
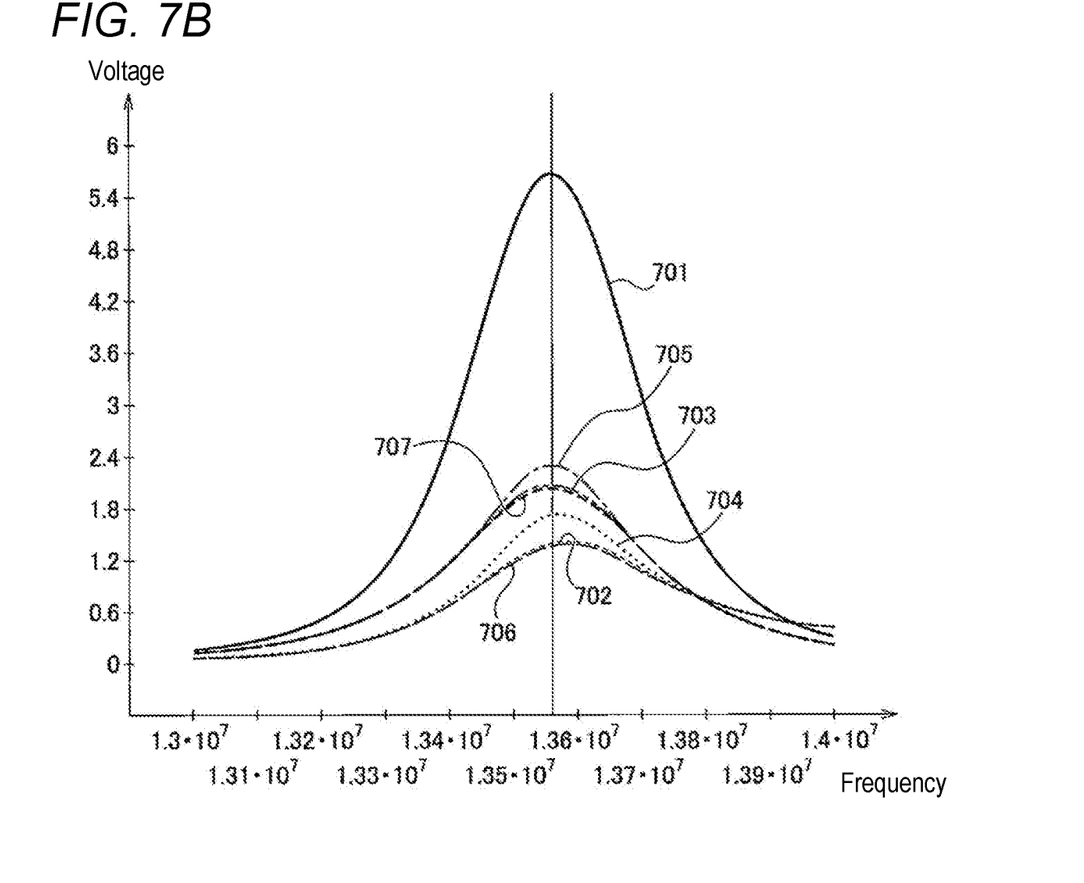

FIGS. 7A and 7B are diagrams illustrating an example of a simulation result indicating changes in a voltage (hereinafter may be simply referred to as a detected voltage) detected by the detection circuit 44 depending on the presence or absence of entrapment of foreign matter. In this simulation, for the sake of simplification, as illustrated in FIG. 7A, the number of detection coils of the foreign matter detecting device 4 is three (that is, n=3), and the detection coils 42-1 to 42-3 are arranged in a line between the power supply circuit 41 and the detection circuit 44. Furthermore, the detection coil 42-1 and the detection coil 42-3 are disposed on the front surface of the substrate 45. In contrast, the detection coil 42-2 is disposed on the rear surface of the substrate 45. In this simulation, inductance L of each detection coil is 50 nH, and capacitance C of each of the capacitors 43-1 to 43-3 is 2.755 nF. Resistance R of each resonance circuit formed by each detection coil and the corresponding capacitor is 0.1Ω. That is, the resonance frequency f of each resonance circuit is 13.56 MHz. Each of the coupling degree $k_{12}$ between the detection coil 42-1 and the detection coil 42-2 and the coupling degree $k_{23}$ between the detection coil 42-2 and the detection coil 42-3 is 0.01. Furthermore, the coupling degree $k_{13}$ between the detection coil 42-1 and the detection coil 42-3 is ($k_{12}^2$=0.0001).

In FIG. 7B, the horizontal axis indicates a frequency and the vertical axis indicates a detected voltage. A graph 701 represents the frequency characteristic of the detected voltage in a case where there is no foreign matter between the transmission coil 12 and the reception coil 21. A graph 702 represents the frequency characteristic of the detected voltage in a case where it is assumed that inductance of the detection coil 42-1 is reduced by 10% due to entrapment of foreign matter. Furthermore, a graph 703 represents the frequency characteristic of the detected voltage in a case where it is assumed that the resistance of the resonance circuit including the detection coil 42-1 is tripled due to the loss caused by entrapment of foreign matter. Similarly, a graph 704 represents the frequency characteristic of the detected voltage in a case where it is assumed that the inductance of the detection coil 42-2 is reduced by 10% due to entrapment of foreign matter. A graph 705 represents the frequency characteristic of the detected voltage in a case where it is assumed that the resistance of the resonance circuit including the detection coil 42-2 is tripled due to the loss caused by entrapment of foreign matter. A graph 706 represents the frequency characteristic of the detected voltage in a case where it is assumed that the inductance of the detection coil 42-3 is reduced by 10% due to entrapment of foreign matter. A graph 707 represents the frequency characteristic of the detected voltage in a case where it is assumed that the resistance of the resonance circuit including the detection coil 42-3 is tripled due to the loss caused by entrapment of foreign matter.

As illustrated in the graphs 701 to 707, it can be seen that the detected voltage in a case where it is assumed that foreign matter is entrapped between the transmission coil 12 and the reception coil 21 is lower than the detected voltage in a case where there is no such foreign matter. In particular, in a case where AC power having a frequency equal to the resonance frequency (13.56 MHz) of each resonance circuit is supplied from the power supply circuit 41, the voltage change becomes remarkable. Therefore, it can be seen that the foreign matter detecting device 4 can detect the foreign matter entrapped between the transmission coil 12 and the reception coil 21 by checking the detected voltage.

Note that according to a modification, each detection coil included in the foreign matter detecting device 4 may be provided on an identical surface of the substrate 45.

Figure 8A:
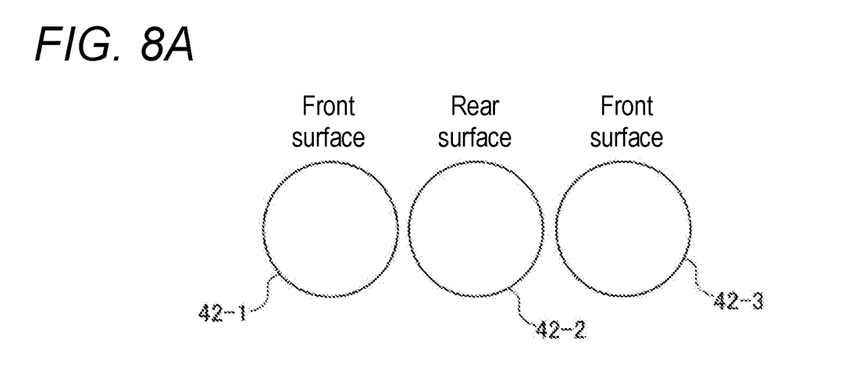
FIGS. 8A and 8B are diagrams illustrating another example of a simulation result indicating changes in a detected voltage depending on the presence or absence of entrapment of foreign matter according to a modification.
Figure 8B:
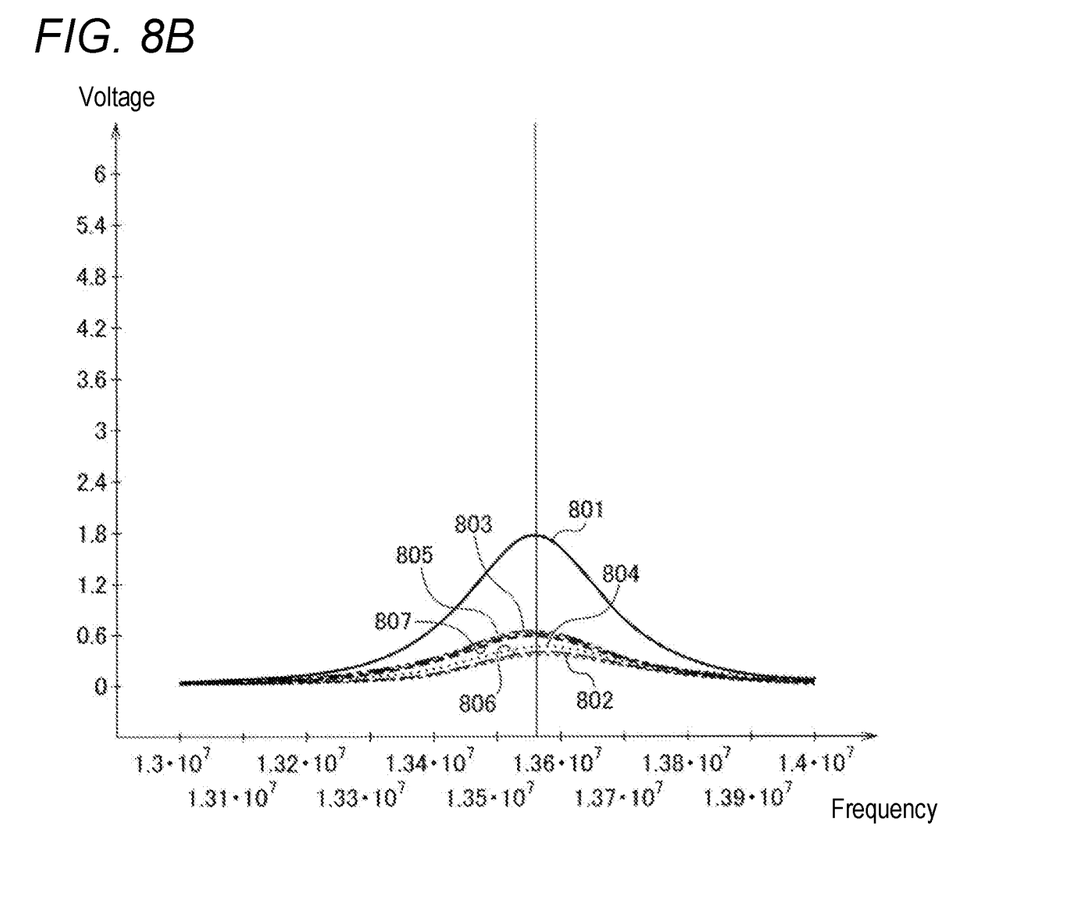

FIGS. 8A and 8B are diagrams illustrating another example of a simulation result indicating changes in the detected voltage depending on the presence or absence of entrapment of foreign matter according to this modification. In this simulation, as illustrated in FIG. 8A, the number of detection coils of the foreign matter detecting device 4 is three (that is, n=3), and the detection coils 42-1 to 42-3 are arranged in a line between the power supply circuit 41 and the detection circuit 44. In addition, it is assumed that all the detection coils are disposed on the front surface of the substrate 45. Furthermore, in this simulation, parameter values of each circuit element are identical to the parameter values used in the simulation illustrated in FIGS. 7A and 7B. However, the coupling degree between the detection coils is ½ of the degree of coupling in the simulations illustrated in FIGS. 7A and 7B.

In FIG. 8B, the horizontal axis indicates a frequency and the vertical axis indicates a detected voltage. A graph 801 represents the frequency characteristic of the detected voltage in a case where there is no foreign matter between the transmission coil 12 and the reception coil 21. A graph 802 represents the frequency characteristic of the detected voltage in a case where it is assumed that inductance of the detection coil 42-1 is reduced by 10% due to entrapment of foreign matter. A graph 803 represents the frequency characteristic of the detected voltage in a case where it is assumed that the resistance of the resonance circuit including the detection coil 42-1 is tripled due to the loss caused by entrapment of foreign matter. Similarly, a graph 804 represents the frequency characteristic of the detected voltage in a case where it is assumed that the inductance of the detection coil 42-2 is reduced by 10% due to entrapment of foreign matter. A graph 805 represents the frequency characteristic of the detected voltage in a case where it is assumed that the resistance of the resonance circuit including the detection coil 42-2 is tripled due to the loss caused by entrapment of foreign matter. A graph 806 represents the frequency characteristic of the detected voltage in a case where it is assumed that the inductance of the detection coil 42-3 is reduced by 10% due to entrapment of foreign matter. A graph 807 represents the frequency characteristic of the detected voltage in a case where it is assumed that the resistance of the resonance circuit including the detection coil 42-3 is tripled due to the loss caused by entrapment of foreign matter.

As illustrated in the graphs 801 to 807, also in this modification, it can be seen that the detected voltage in a case where it is assumed that foreign matter is entrapped between the transmission coil 12 and the reception coil 21 is lower than the detected voltage in a case where there is no such foreign matter. Therefore, even in a case where the respective detection coils are disposed on an identical surface of the substrate 45, it can be seen that the foreign matter detecting device 4 can detect the foreign matter entrapped between the transmission coil 12 and the reception coil 21 by checking the detected voltage.

Furthermore, the detection coils included in the foreign matter detecting device 4 may be provided so as to have a higher arrangement density, and the degree of coupling between the detection coils may be increased.

Figure 9A:
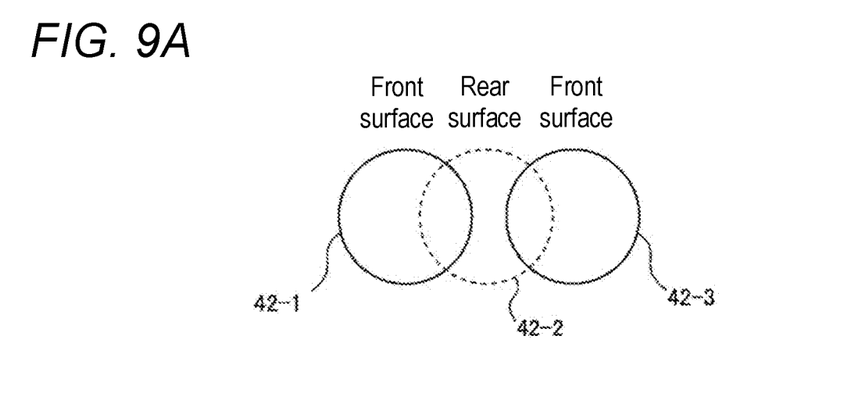
FIGS. 9A and 9B are diagrams illustrating yet another example of a simulation result indicating changes in a detected voltage depending on the presence or absence of entrapment of foreign matter according to another modification.
Figure 9B:
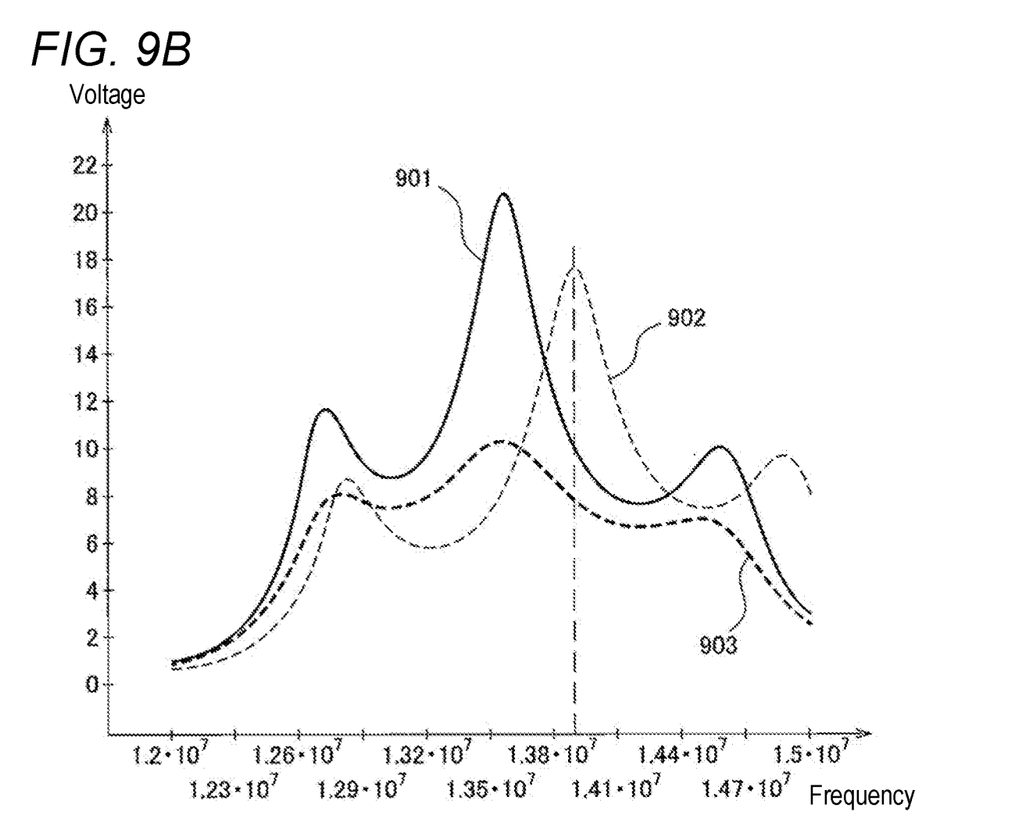

FIGS. 9A and 9B are diagrams illustrating yet another example of a simulation result indicating changes in the detected voltage depending on the presence or absence of entrapment of foreign matter according to this modification. Also in this simulation, as illustrated in FIG. 9A, the number of detection coils of the foreign matter detecting device 4 is three (that is, n=3), and the detection coils 42-1 to 42-3 are arranged in a line between the power supply circuit 41 and the detection circuit 44. Furthermore, similarly to the example illustrated in FIG. 7A, the detection coil 42-1 and the detection coil 42-3 are disposed on the front surface of the substrate 45. In contrast, the detection coil 42-2 is disposed on the rear surface of the substrate 45. However, the detection coils are disposed so that the degree of overlapping between the detection coils is greater than that in the example illustrated in FIG. 7A. Furthermore, in this simulation, parameter values of each circuit element are identical to the parameter values used in the simulation illustrated in FIGS. 7A and 7B. However, the coupling degree between the detection coils is ten times of the coupling degree in the simulation illustrated in FIGS. 7A and 7B.

In FIG. 9B, the horizontal axis indicates a frequency and the vertical axis indicates a detected voltage. A graph 901 represents the frequency characteristic of the detected voltage in a case where there is no foreign matter between the transmission coil 12 and the reception coil 21. A graph 902 represents the frequency characteristic of the detected voltage in a case where it is assumed that inductance of the detection coil 42-1 is reduced by 10% due to entrapment of foreign matter. Furthermore, a graph 903 represents the frequency characteristic of the detected voltage in a case where it is assumed that the resistance of the resonance circuit including the detection coil 42-1 is tripled due to the loss caused by entrapment of foreign matter.

As illustrated in the graphs 901 to 903, also in this modification, it can be seen that even though extremums of the detected voltage appear at a plurality of frequencies, the detected voltage in a case where it is assumed that foreign matter is entrapped between the transmission coil 12 and the reception coil 21 changes from the detected voltage obtained in a case where there is no such foreign matter. Note that as illustrated in this example, in a case where the resonance frequency (13.56 MHz) of each resonance circuit and the frequency (for example, 13.9 MHz) of the AC power supplied from the power supply circuit 41 are different from each other, the detected voltage may increase due to entrapment of foreign matter. However, as described above, by setting the upper limit value in the range of the reference voltage, the foreign matter detecting device 4 can accurately detect the foreign matter entrapped even in a case where the detected voltage rises due to entrapment of the foreign matter.

As described above, the foreign matter detecting device includes a plurality of detection coils capable of being electromagnetically coupled, the plurality of detection coils being disposed between the transmission coil and the reception coil in a case where the power transmission device and the power reception device are in a positional relationship capable of transmitting power from the power transmission device to the power reception device. The detection circuit detects a voltage due to AC power that is supplied to any of the plurality of detection coils and is transmitted via the plurality of detection coils. In a case where the detected voltage is out of the predetermined reference range, the foreign matter detecting device judges that foreign matter is entrapped between the transmission coil and the reception coil. As a result, the foreign matter detecting device can accurately detect foreign matter entrapped between the transmission coil and the reception coil even if the foreign matter is smaller than each of the transmission coil and the reception coil. As a result, the foreign matter detecting device can improve foreign matter detection accuracy. Furthermore, since this foreign matter detecting device detects foreign matter by using AC power that is different from the AC power transmitted from the power transmission device to the power reception device, the foreign matter detecting device can detect foreign matter without being affected by power transmission from the power transmission device to the power reception device.

Note that according to a modification, the foreign matter detecting device 4 may be attached to the power reception device 3. In this case, the power reception device 3 may further include a switching element (not illustrated) for selecting whether or not to short-circuit both ends of the reception coil 21 in parallel with the reception coil 21, and a control circuit (not illustrated) for selecting turning on or off of the switching element. A signal representing the detection result of the foreign matter from the detection circuit 44 is output to the control circuit of the power reception device 3. The control circuit turns on the switching element and short-circuits both the ends of the reception coil 21 in a case where the signal indicates that the foreign matter entrapped between the transmission coil 12 and the reception coil 21 is detected. As a result, power transmission from the power transmission device 2 to the power reception device 3 is interrupted, and occurrence of failure due to the entrapped foreign matter is prevented.

In addition, in a case where each of the power transmission device 2 and the power reception device 3 has a communication device (not illustrated) for communicating with each other, the control circuit of the power reception device 3 may transmit a signal instructing the power transmission device 2 to stop power transmission via the communication device in a case where the signal received from the detection circuit 44 of the foreign matter detecting device 4 indicates that the foreign matter entrapped between the transmission coil 12 and the reception coil 21 is detected. Then, the control circuit of the power supply circuit 11 of the power transmission device 2 may stop power supply from the power supply circuit 11 to the transmission coil 12 when receiving the signal instructing stop of power transmission via the communication device.

Furthermore, the foreign matter detecting device 4 may be attached to each of the power transmission device 2 and the power reception device 3. That is, two foreign matter detecting devices 4 may be disposed between the transmission coil 12 and the reception coil 21.

According to another modification, the foreign matter detecting device 4 may further include a removal mechanism (not illustrated) for removing foreign matter entrapped between the transmission coil 12 and the reception coil 21. In this case, when a detection circuit 44 detects foreign matter entrapped between the transmission coil 12 and the reception coil 21, the removal mechanism may operate to remove the foreign matter. Note that such a removal mechanism may be, for example, a wiper that wipes the surface of a casing of the power transmission device 2 facing the power reception device 3, or the surface of a casing of the power reception device 3 facing the power transmission device 2. Alternatively, such a removal mechanism may be an air gun that blows air between the power transmission device 2 and the power reception device 3 to remove foreign matter. As a result, even in a case where foreign matter is detected, the foreign matter detecting device 4 can continue power transmission from the power transmission device 2 to the power reception device 3, while preventing failure of the power transmission device 2 or the power reception device 3 due to ignition of the foreign matter and heat generation of the foreign matter.

As described, those skilled in the art can make various modifications according to the embodiment within the scope of the present invention.

The invention claimed is:

1. A foreign matter detecting device comprising:
a plurality of detection coils disposed so as to be capable of being electromagnetically coupled to each other between a transmission coil of a power transmission device and a reception coil of a power reception device between which power is transmitted in a non-contact manner;
a plurality of capacitors each forming a resonance circuit together with respective ones of the plurality of detection coils;
a power supply circuit configured to supply AC power having a predetermined frequency to one of the plurality of detection coils that comprises an input coil; and
a detection circuit configured to detect a voltage of the AC power transmitted via the plurality of detection coils from one of the plurality of detection coils that comprises an output coil different from the input coil and configured to detect foreign matter entrapped between the transmission coil and the reception coil according to the voltage detected.

2. The foreign matter detecting device according to claim 1, wherein the detection circuit judges that there is foreign matter entrapped between the transmission coil and the reception coil in a case where the voltage detected is out of a predetermined reference voltage range.

3. The foreign matter detecting device according to claim 1, wherein a resonance frequency of the resonance circuit formed by each of the plurality of detection coils and each of the plurality of capacitors respectively corresponding to each of the plurality of detection coils differs from a frequency of AC power supplied to the transmission coil.

4. The foreign matter detecting device according to claim 1, wherein the predetermined frequency is different from a frequency of AC power supplied to the transmission coil.

5. The foreign matter detecting device according to claim 1, wherein the plurality of detection coils is disposed so as to cover entirety of the transmission coil as viewed from a central axis direction of the transmission coil.

6. The foreign matter detecting device according to claim 5, wherein a size of each of the plurality of detection coils viewed from the central axis direction of the transmission coil is smaller than a size of the transmission coil viewed from the central axis direction of the transmission coil.

7. The foreign matter detecting device according to claim 2, wherein a resonance frequency of the resonance circuit formed by each of the plurality of detection coils and each of the plurality of capacitors respectively corresponding to each of the plurality of detection coils differs from a frequency of AC power supplied to the transmission coil.

8. The foreign matter detecting device according to claim 2, wherein the predetermined frequency is different from a frequency of AC power supplied to the transmission coil.

9. The foreign matter detecting device according to claim 2, wherein the plurality of detection coils is disposed so as to cover entirety of the transmission coil as viewed from a central axis direction of the transmission coil.

10. The foreign matter detecting device according to claim 9, wherein a size of each of the plurality of detection coils viewed from the central axis direction of the transmission coil is smaller than a size of the transmission coil viewed from the central axis direction of the transmission coil.

11. The foreign matter detecting device according to claim 3, wherein the predetermined frequency is different from a frequency of AC power supplied to the transmission coil.

12. The foreign matter detecting device according to claim 3, wherein the plurality of detection coils is disposed so as to cover entirety of the transmission coil as viewed from a central axis direction of the transmission coil.

13. The foreign matter detecting device according to claim 12, wherein a size of each of the plurality of detection coils viewed from the central axis direction of the transmission coil is smaller than a size of the transmission coil viewed from the central axis direction of the transmission coil.

14. The foreign matter detecting device according to claim 4, wherein the plurality of detection coils is disposed so as to cover entirety of the transmission coil as viewed from a central axis direction of the transmission coil.

15. The foreign matter detecting device according to claim 14, wherein a size of each of the plurality of detection coils viewed from the central axis direction of the transmission coil is smaller than a size of the transmission coil viewed from the central axis direction of the transmission coil.

* * * * *